United States Patent [19]

Lorimor

[11] Patent Number: 4,920,861
[45] Date of Patent: May 1, 1990

[54] LOAD PISTON RESET CONTROL MECHANISM

[75] Inventor: Larry W. Lorimor, Peoria, Ill.
[73] Assignee: Caterpillar Inc., Peoria, Ill.
[21] Appl. No.: 326,764
[22] Filed: Mar. 21, 1989
[51] Int. Cl.[5] .............................................. F16D 25/10
[52] U.S. Cl. ........................................ 91/446; 91/448; 91/517; 192/87.19; 192/109 F
[58] Field of Search .............. 192/109 F, 87.18, 87.19, 192/85 R, 3.57; 91/446, 448; 60/427, 468, 484

[56] References Cited

U.S. PATENT DOCUMENTS

| | | | |
|---|---|---|---|
| 3,181,394 | 5/1965 | Ramsel et al. | 74/754 |
| 3,389,770 | 6/1968 | Golan et al. | 192/87.13 |
| 3,948,146 | 4/1976 | Maurer et al. | 192/87.19 X |
| 3,991,865 | 11/1976 | Komatsu | 192/109 |
| 4,132,302 | 1/1979 | Chatterjea | 192/87.13 |
| 4,583,624 | 4/1986 | Blake | 192/109 F |
| 4,620,560 | 11/1986 | Coutant | 192/109 F |
| 4,676,348 | 6/1987 | Coutant | 192/3.57 |
| 4,751,866 | 6/1988 | Blake | 91/446 |

Primary Examiner—Edward K. Look
Attorney, Agent, or Firm—J. W. Burrows

[57] ABSTRACT

Fluid systems for controlling clutch engagement of a vehicle drive train normally have modulating pressure relief valves to aid in smooth clutch engagement. It is desired in such systems to ensure that the system pressure is reduced during a shift so that the load piston of the modulating pressure relief valve is fully reset prior to engagement of the vehicle drive train. In this arrangement, a fluid system is provided which has a plurality of clutches. In order to ensure that the load system is fully reset, a load piston reset control mechanism is provided which establishes a path to vent the pressurized fluid from a load piston pressure chamber of a modulating presure relief valve in response to the pressure of the fluid in one of the clutches being below a predetermined pressure level. The load piston reset control mechanism has a valve mechanism for controllably connecting pressurized fluid from the load piston pressure chamber to the reservoir in response to the pressure of the fluid directed to one of the clutches being below the predetermined value. The valve mechanism has a signal control valve therein to maintain the valve mechanism in the vented position for a predetermined period of time in order to ensure the load piston has moved to its full reset position even if the fill pressure to the clutches is to high. With the load piston in the full reset position, smooth engagement of the clutches is obtained.

22 Claims, 4 Drawing Sheets

LOAD PISTON RESET CONTROL MECHANISM

TECHNICAL FIELD

This invention relates generally to a fluid system having a modulating relief valve for controlling the rate of pressure rise to a fluid actuator and more particularly to a load piston reset control mechanism to control the unloading of the modulating relief valve to fully reset the load piston of the modulating relief valve prior to pressurizing the fluid actuator.

BACKGROUND ART

In many fluid systems, such as transmissions having fluid actuated clutches, a problem exists in ensuring that the load piston of the modulating relief valve is fully reset prior to initiating engagement of the respective clutches during a shift from one gear to another gear. This problem may be associated with the fact that the system pressure does not have ample time to decrease before the respective clutch is filled and clutch engagement is again initiated or the problem may be caused by the clutch fill pressure remaining to high due to internal resistance to fluid flow. The internal resistance to fluid flow may be caused by cold oil, to much fluid flow from the source, or by the internal passages in the fluid system being to restrictive. When the load piston does not fully reset, the higher initial engagement pressure in the system creates harsh clutch engagement or other undesirable shift dynamics which are detrimental to the life of the clutch and other associated elements in the transmission. It is advantageous to provide a system that ensures full reset of the load piston prior to the new clutch being filled and the pressure begins to increase. Furthermore, in order to control overall costs, the system should be simple in construction and adaptable to other existing systems.

Various arrangements have been used in the past in an effort to minimize the above-noted problems. One such arrangement is disclosed in U.S. Pat. No. 4,751,866 which issued June 21, 1988 to W. W. Blake and assigned to the same assignee as the subject invention. This patent teaches a control system for a transmission having directional and speed clutches in which the speed clutches are engaged first and subsequently followed by engagement of the directional clutches. In this arrangement, during a speed change, the fluid to one of the clutches must be vented and another clutch subsequently filled and pressurized. While the venting and filling of the respective clutches are occurring, the load piston of the modulating relief valve must move to its fully unloaded condition in order to provide smooth engagement of the clutches upon repressurization thereof. Since resetting of the load piston must happen very quickly, numerous problems may exist during a shift. The ratio valve of the above-noted patent is designed so that when the pressure of the directional clutches is three times that of the pressure acting on the load piston, the ratio valve will move to a position in which the load piston is vented to the reservoir. This enables the load piston to quickly reset. However, it has been found at times that the ratio valve does not move to the full open position but merely moves to a throttling position, thus not allowing enough time to fully vent the load piston pressure chamber. Consequently, the pressure in the system does not reach its minimum level and results in harsh engagement of the directional clutches during initial reengagement thereof.

U.S. Pat. No. 3,181,394 which issued on May 4, 1965 to C. A. Ramsel, et al. teaches a control system for a transmission having directional and speed clutches. This system includes a modulating pressure relief valve having a load piston which controls the rate of pressure rise in the clutch actuator during engagement of the respective clutch. In this arrangement, a quick response valve is illustrated which moves to a quick vent position once the pressure there-across reduces to a predetermined value. This arrangement also requires that the system pressure reduces to some predetermined level prior to opening of a vent to unload the load piston pressure chamber. Consequently, there are times during the operation of this system that the load piston may not fully be unloaded prior to engagement of the desired clutch.

U.S. Pat. No. 3,389,770 issued June 25, 1968 to K. F Golan, et al. and assigned to the same assignee as the subject invention teaches a control system having directional and speed clutches. In this arrangement, the system also includes a modulating pressure relief valve having a load piston for controlling the rate of pressure rise in the system during engagement of the respective clutches. Based upon obtaining a predetermined pressure differential in the system, a quick response valve is provided to open during filling of the clutches. The opening of the quick response valve allows the load piston to be reset more quickly. However, there may be times during a speed change that the desired pressure differential in the system is not achieved quick enough to allow the quick response valve to function.

U.S. Pat. No. 3,991,865 issued Nov. 16, 1976 to M. Komatsu teaches a control system for a transmission having pressure applied clutches and a modulating pressure relief valve to control the rate of pressure rise in the system during engagement of the respective clutches. This arrangement has a quick return valve that operates in response to a predetermined differential pressure being obtained in the system during a change in operation from one clutch to another to allow the new clutch to quickly fill prior to starting of a gradual pressure increase.

U.S. Pat. No. 4,132,302 issued Jan. 2, 1979 to P. K. Chatterjea teaches a control system for a transmission having directional and speed clutches. This system includes a load piston which controls the rate of pressure rise in the respective clutch actuators. This arrangement also has a reset piston which automatically connects the load piston pressure chamber with the drain for quick load piston resetting. The reset piston is responsive to the pressure in the clutch actuators. The pressure in the clutch actuators must be reduced to the level equivalent to the clutch fill pressure in order for the reset piston to quickly respond and unload the load piston. Consequently, if the clutch is filled before the system pressure reaches the required reduced pressure or if the fill pressure is to high, the load piston does not reach the full reset position. This results in harsh clutch engagement.

U.S. Pat. No. 4,676,348 issued June 30, 1987 to A. R. Coutant and assigned to the same assignee as the subject invention teaches a control system for a transmission having directional and speed clutches. This arrangement teaches a system wherein an accumulator valve is provided to establish a time delay in the system. Once the system pressure on the clutches reaches a predetermined level, the accumulator piston holds the pressure for a predetermined amount of time and then allows the system pressure operating on the clutches to be reduced in order to save horsepower.

The present invention is directed to overcoming one or more of the problems as set forth above.

DISCLOSURE OF THE INVENTION

In one aspect of the present invention, a load piston reset control mechanism is provided and adapted for use in a fluid system. The fluid system includes a source of pressurized fluid, a reservoir, and first and second force transmitting mechanisms each adaptable to receive fluid from the source. The fluid system also includes a first and second selector valves connected between the source and the respective force transmitting mechanism and each moveable to selectively direct fluid from the source to fill and pressurize the respective force transmitting mechanism and to vent the respective force transmitting mechanism to the reservoir. A modulating pressure relief valve is provided in the system and has a valving element operative to control the fluid flow to the force transmitting mechanisms and a load piston moveable in response to a fluid pressure signal controllably received from one of the force transmitting mechanisms between a substantially unloaded position and a loaded position. The modulating relief valve controls the rate of pressure rise of the fluid directed to the force transmitting mechanisms. A valve means is provided for controllably connecting the fluid pressure signal acting on the load piston with the reservoir in response to the pressure of the fluid being directed to the one force transmitting mechanism being below a predetermined value.

In another aspect of the present invention, a load piston reset control mechanism is provided in combination with a fluid system. The fluid system includes a source of pressurized fluid, a reservoir, first and second force transmitting mechanisms which are operative to receive fluid from the source. A first selector valve is connected between the source and the first and second force transmitting mechanisms and is moveable between first and second operative positions to selectively direct fluid from the source to the first and second force transmitting mechanisms and to vent the fluid therefrom. A third force transmitting mechanism is provided and is operative to receive fluid from the source. A second selector valve is connected between the source and the third force transmitting mechanism and is moveable to selectively direct fluid from the source to fill and pressurize the third force transmitting mechanism and to vent fluid therefrom. A differential valve is connected between the source and the second selector valve and is operative to establish a lower pressure downstream thereof. A modulating pressure relief valve is connected between the differential valve and the second selector valve and is operative to control the rate of pressure rise of the fluid being directed to the respective force transmitting mechanisms. The modulating pressure relief valve has load piston and a valve element operative to control the fluid flow between the force transmitting mechanisms and the reservoir when the load piston is moved between the substantially unloaded position and a loaded position in response to a fluid pressure signal controllably received from the third force transmitting mechanism. The load piston reset control mechanism has a valve means for controllably connecting the fluid pressure signal acting on the load piston with the reservoir in response to the pressure of the fluid directed to the third force transmitting mechanism being below a predetermined value.

The present invention provides a load piston reset control mechanism adapted for use in a control system to provide a control for a load piston of a modulating pressure relief valve to ensure that the load piston thereof is fully reset when a speed change is made in the transmission. The controllably connecting valve means vents the pressurized fluid acting on the load piston in response to the fluid pressure within the force transmitting mechanism being below a predetermined value. This arrangement allows the load piston to be fully reset in response to the pressure in the force transmitting mechanism being lowered to a given level. This is accomplished without requiring a differential pressure being established in the system. Consequently, a more definite action is provided in order to quickly lower the fluid pressure signal acting on the load piston even though the fill pressure to the speed clutch may be high.

BEST MODE FOR CARRYING OUT THE INVENTION

Figure 1:
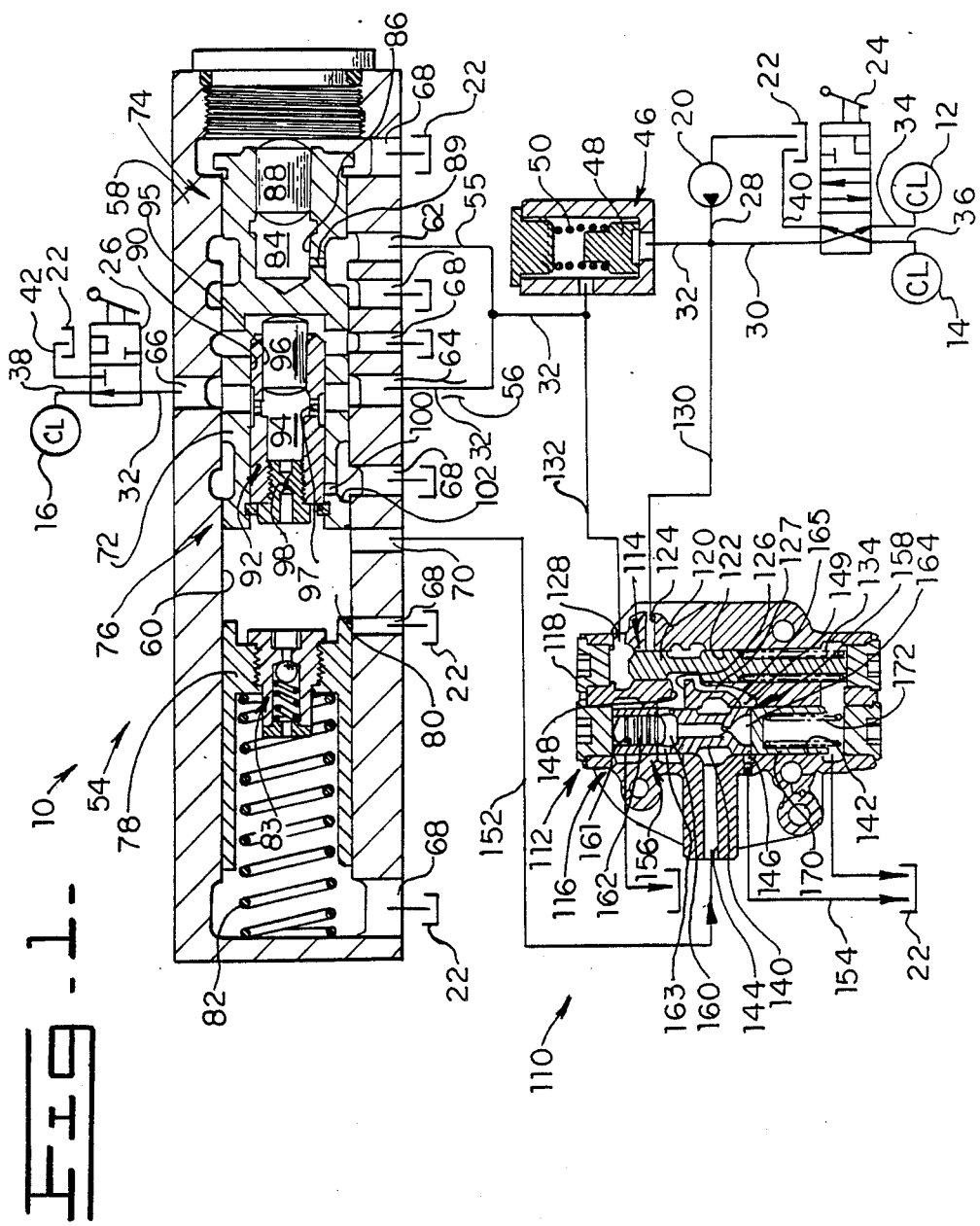
FIG. 1 is a partial schematic and diagrammatic representation of a fluid system incorporating an embodiment of the present invention in one operational mode.

Referring now to the drawings, and more particularly to FIGS. 1 through 4, a fluid system 10 is shown for use in a vehicle (not shown) to selectively control the engagement and disengagement of a plurality of force transmitting mechanisms, such as speed clutches 12,14 and a directional clutch 16.

The fluid system 10 includes a source of pressurized fluid, such as a pump 20, adapted to receive fluid from a reservoir 22 and first and second selector valves, such as speed and directional selector valves 24,26, are connected to the pump 20 by distribution conduits 28,30,32. Conduits 34,36 respectively connect the speed clutches 12,14 to the speed selector valve 24 while a conduit 38 connects the directional clutch 16 to the directional selector valve 26. Each of the selector valves 24,26 are respectively connected to the reservoir 22 by conduits 40,42.

A differential valve 46 is provided in the fluid system 10 and is located in the distribution conduit 32 between the source 20 and the second selector valve 26. The differential valve 46 includes a poppet element 48 located therein and biased by a spring 50 to a position blocking fluid flow therethrough. The differential valve 46 is operative to provide a predetermined differential pressure in the distribution conduit 32 upstream and downstream thereof.

A modulating relief valve 54 is connected to the pump 20 by the distribution conduit 32 and a branch conduit 55 and operative to control the rate of pressure rise in the fluid system 10 during engagement of the respective clutches 12,14,16. An orifice 56 is located in the distribution conduit 32 downstream of the connection of the branch conduit 55 to the distribution conduit 32 and is operative to control the rate of fluid flow to the directional clutch 16. The modulating relief valve 54 includes a housing 58 having a single bore 60 defined therein, an inlet port 62, a control port 64, an outlet port 66, drain ports 68 and a signal port 70. The outlet port 66 is in continuous communication with the control port 64. With the exception of the outlet port 66 which is in transverse alignment with the control port 64, each of the above-noted ports 62,64,66,68,70 intersect the single bore 60 at axially spaced locations.

A valving element 72 having first and second end portions 74,76 is slideably disposed in the single bore 60 of the housing 58. A load piston 78 is slideably disposed in the single bore 60 adjacent the second end portion 76 of the valving element 72. A load piston pressure chamber 80 is defined in the single bore 60 between the second end portion 76 of the valving element 72 and the load piston 78. The load piston pressure chamber 80 has an effective cross-sectional area of a predetermined size which, in the subject arrangement, is equivalent to the end of the valving element 72 thereof. A spring 82 biases the load piston 78 towards the second end portion 76 of the valving element 72. A relief valve 83 is disposed in the load piston 78 and is operative to limit the maximum pressure level in the load piston pressure chamber 80.

The first end portion 74 of the valving element 72 in the modulating pressure relief valve 54 defines a bypass control pressure chamber 84 therein having an effective cross-sectional area approximately four and one-half times smaller than the effective cross-sectional area of the load piston pressure chamber 80. The bypass control pressure chamber 84 is in open communication with the pressurized fluid in the distribution conduit 32 and is operative to bias the valving element 72 towards a position to communicate the inlet port 62 with the reservoir 22 via drain port 68. The bypass control pressure chamber 84 is defined between the bottom of a blind bore 86 located in the first end portion 74 of the valving element 72 and a slug 88 slideably disposed therein. A passage 89 interconnects the bypass control pressure chamber 84 with the inlet port 62 thereof.

The second end portion 76 of the valving element 72 defines a blind bore 90 having a ratio valve 92 slideably disposed therein. The ratio valve 92 defines a ratio valve pressure chamber 94 therein having an effective cross-sectional area of a predetermined size and being in open fluid communication with pressurized fluid in the distribution conduit 32. The ratio valve pressure chamber 94 is defined between the bottom of a blind bore 95 located in the ratio valve 92 and a slug 96 slideably disposed therein. A passage 97 interconnects the ratio valve pressure chamber 94 with the distribution conduit 32 through the control port 64. The opposite end of the ratio valve 92 is immediately adjacent the load piston pressure chamber 80 and has an effective cross-sectional area approximately three times greater than the effective cross-sectional area of the ratio valve pressure chamber 94. The ratio valve pressure chamber 94 defined in the ratio valve is in controlled communication with the load piston pressure chamber 80 by a restrictive orifice 98.

The valving element 72 defines a passage 100 located in the second end portion 76 thereof axially spaced from the end thereof adjacent the load piston pressure chamber 80 and operatively interconnects the blind bore 90 in the second end portion 76 with a groove 102 defined in the outer periphery of the second end portion 76 thereof. The groove 102 is in continuous open communication with one of the drain ports 68. The ratio valve 92 is moveable between a first position at which the passage 100 is blocked from communicating with the load piston pressure chamber 80 and a second position at which the passage 100 is in open communication therewith.

A load piston reset control mechanism 110 is provided in the fluid system 10. The load piston reset control mechanism 110 has a valve means 112 for controllably communicating the load piston pressure chamber 80 with the reservoir 22 in response to the pressure of the fluid being directed to the third force transmitting mechanism 16 being below the predetermined value. The valve means 112 includes a trigger valve 114 and a signal control valve 116 both being disposed in a housing 118. The trigger valve 114 has a valving element 120 slideably disposed in a first bore 122 of the housing 118. The housing 118 has a first inlet port 124, a first outlet port 126, a bypass port 127, and a signal port 128 defined therein and each of the ports 124,126,127,128 intersect the bore 122 at axially spaced locations.

The first inlet port 124 is connected to the source 20 by a conduit 130 and the distribution conduit 28. The signal port 128 is connected to the distribution conduit 32 downstream of the differential valve 46 by a conduit 132. The valving element 120 is moveable between a first position by the force of a spring 134 and to a second position responsive to the fluid pressure being directed thereto from the distribution conduit 32 through the conduit 132. At the first position of the valving element 120, the first inlet port 124 is in open communication with the first outlet port 126. When the valving element 120 is in its second position, the first inlet port 124 is blocked from the first outlet port 126.

The signal control valve 116 has a valving element 140 slideably disposed in a second bore 142 of the housing 118. It should be recognized that the trigger valve 114 and the signal control valve 116 could be located in separate housings without departing from the essence of the invention. The housing 118 has a second inlet port 144, a second outlet port 146, and an actuator port 148 each intersecting the second bore 142 at axially spaced locations.

The second inlet port 144 is connected to the load piston pressure chamber 80 of the modulating relief valve 54 by a conduit 152. The second outlet port 146 is connected to the reservoir 22 by a conduit 154 while the actuator port 148 of the signal control valve 116 is common with the first outlet port 126 of the trigger valve 114. It is recognized that if the trigger valve 114 and the signal control valve 116 were located in different housings, a conduit would be provided to interconnect the first outlet port 126 and the actuator port 148. A passageway 149 communicates the bypass port 127 of the trigger valve 114 with the second outlet port 146 of the signal control valve 116.

The valving element 140 of the signal control valve 116 has first and second end portions 156,158 and is moveable between a first position, a second position and within an intermediate range. The first end portion 156 of the valving element 140 in the signal control valve 116 defines a first pressure chamber 160 therein having a predetermined effective cross-sectional area and being in open communication with the actuator port 148 thereof. The first pressure chamber 160 of the signal control valve 116 is defined in the first end portion 156 of the valving element 140 between the bottom of a blind bore 161 and a slug 162 slideably disposed therein. A passage 163 interconnects the first pressure chamber 160 with the actuator port 148. The second end portion 158 of the valving element 140 in the signal control valve 116 has a second pressure chamber 164 defined at the end thereof and has an effective cross-sectional area larger than the predetermined effective cross-sectional area of the first pressure chamber 160 defined in the first end portion 156 thereof. The first pressure chamber 160 of the signal control valve 116 is in restrictive fluid communication with the second pressure chamber 164 by a restrictive orifice 165.

An accumulator piston 170 is slideably disposed in the second bore 142 of the housing 118 adjacent the second end portion 158 of the valving element 140. The second pressure chamber 164 is located between the accumulator piston 170 and the second end portion 158 of the valving element 140. The accumulator piston 170 is moveable between a first position at which the accumulator piston 170 is in intimate contact with the second end portion 158 of the valving element 140 and a second position at which the accumulator piston 170 is spaced from the valving element 140. The accumulator piston 170 is biased towards its first position by a spring 172 and moveable towards its second position in response to the presence of pressurized fluid in the second pressure chamber 164 of the signal control valve 116.

Figure 2:
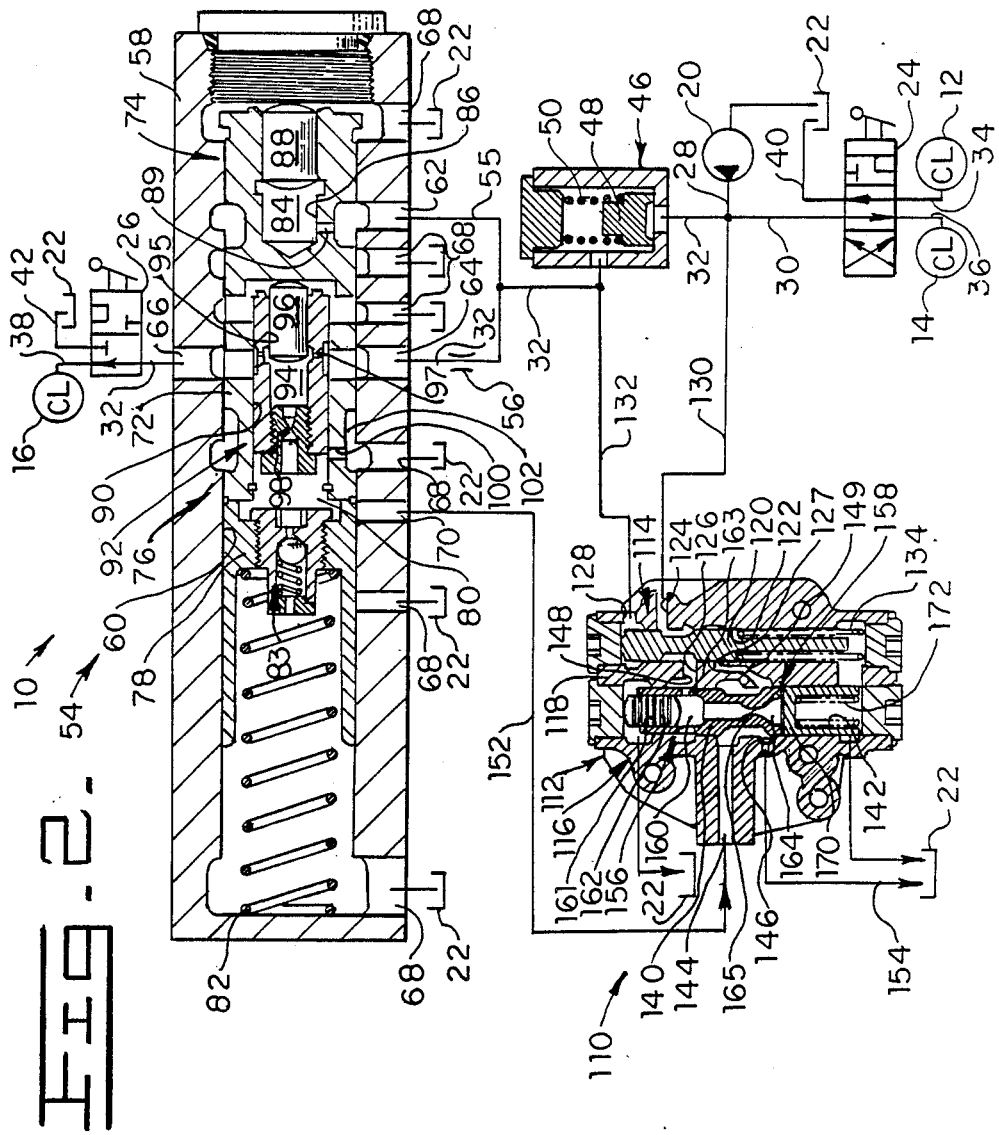
FIG. 2 is a partial schematic and diagrammatic representation of the fluid system of FIG. 1 in another mode of operation.
Figure 3:
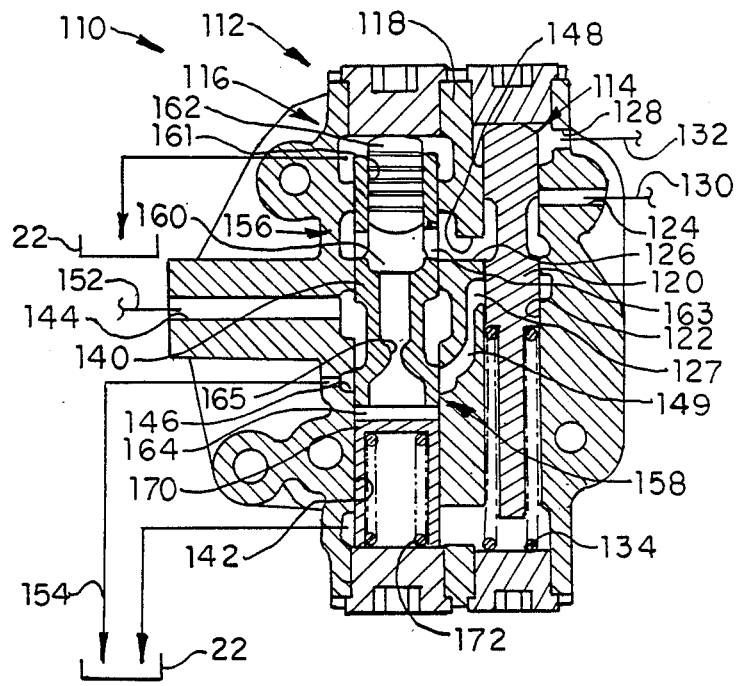
FIG. 3 is a diagrammatic representation of a portion of the fluid system of FIG. 2 illustrating one phase of the operational mode thereof.
Figure 4:
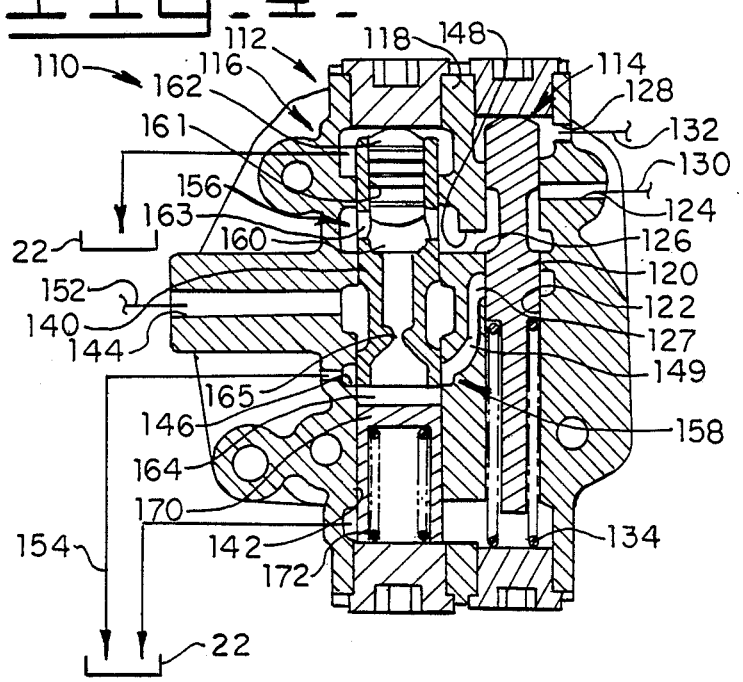
FIG. 4 is a diagrammatic representation of a portion of the fluid system in FIG. 2 illustrating another phase of the operational mode thereof.

As shown in FIG. 1, at the first position of the valving element 140, the second inlet port 144 is blocked from the second outlet port 146 and the second pressure chamber 164 of the signal control valve 116 which is located at the second end portion 158 thereof is in open communication with the second outlet port 146. At the second position thereof, as shown in FIG. 2, the second inlet port 144 is in open communication with the second outlet port 146 and the second pressure chamber 164 is blocked from communication with the second outlet port 146. In the intermediate range of the valving element 140, as shown in FIG. 3, the communication between the second inlet port 144 and the second outlet port 146 is progressively restricted and the second pressure chamber 164 of the signal control valve 116 remains blocked from the second outlet port 146.

Figure 5:
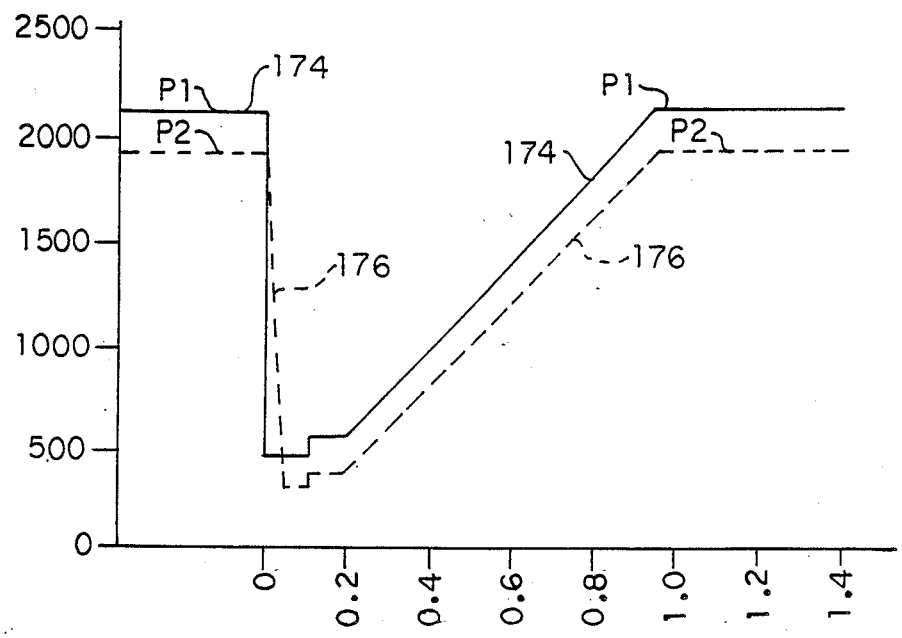
FIG. 5 is a graph illustrating the relationship between the operating pressures versus time of the fluid devices in the operational mode illustrated in FIGS. 2-4.

FIG. 5 illustrates a pressure curve generally depicting the various pressure levels in the speed and directional clutches 12,14,16 versus time during a speed change. The solid line 174 generally represents the pressure (P$_1$) of the fluid directed to the speed clutches 12,14 from a point at which the fluid in one of the clutch 12/14 is being dumped, another one of the clutch 12/14 is being filled, and subsequently followed by a controlled rate of rise in pressure within the another one of the clutches 12/14 until the maximum pressure level in the fluid system 10 is obtained. The dashed line 176 likewise represents the pressure level (P$_2$) of the fluid to the directional clutch 16 from the time the speed change is initiated until the maximum pressure level in the fluid system 10 is obtained. Once the speed shift is initiated, the pressure level of the fluid to the directional clutch 16 drops to a lower level, holds to insure reset of the load piston 78 in the modulating pressure relief valve 54, and subsequently increases in pressure at a controlled rate as depicted by the dashed line 176. The P$_2$ pressure level as illustrated is less than the P$_1$ pressure.

It is recognized that various forms of the fluid system 10 can be used in combination with the load piston reset control mechanism 110 without departing from the essence of the invention. For example, the ratio valve 92 could be deleted and replaced by a conventional check valve having an orifice therein as set forth in the beforementioned U.S. Pat. No. 4,676,348.

INDUSTRIAL APPLICABILITY

In the operation of the fluid system 10, as shown in FIG. 1, the fluid system 10 is shown in one of its operational modes. In this operational mode, the selector valve 24 is in the first operative position to direct pressurized fluid to the speed clutch 12 and the selector valve 26 is in its operative position to direct pressurized fluid to the directional clutch 16.

In this operative condition, the pressure of the fluid acting on the directional clutch 16 is lower than the pressure acting on the speed clutch 12. This is attributed to the differential pressure valve 46 which ensures that the pressure upstream thereof is of a predetermined level greater than the pressure level downstream thereof. The pressurized fluid being directed to the directional clutch 16 is communicated to the load piston pressure chamber 80 through the restrictive orifice 98 of the ratio valve 92 resulting in the load piston 78 being in its fully loaded condition against the bias of the spring 82.

Since the effective cross-sectional area of the load piston pressure chamber 80 which acts on the end of the valving element 72 is larger than the effective cross-sectional area of the bypass control pressure chamber 84, the pressure level of the fluid in the load piston pressure chamber 80 is maintained at a pressure level less than the pressure level in the bypass pressure chamber 84. For example, in the subject arrangement, since the pressure of the fluid in the load piston pressure chamber 80 is established by the force of the spring 82 and the effective cross-sectional area of the load piston pressure chamber 80 is four and one-half times smaller than the effective cross-sectional area of the bypass control pressure chamber 84, then the pressure level in the bypass control pressure chamber 84 must be four and one-half times greater than the pressure level in the load piston pressure chamber 80 in order to maintain the valving element 72 in an equilibrium condition. In order to maintain the pressure balance or equilibrium condition between the bypass control pressure chamber 84 and the load piston pressure chamber 80, excessive fluid flow is bypassed to the reservoir 22 across the inlet port 62 and the drain port 68.

Simultaneously, the ratio valve 92 is maintained in the position illustrated in FIG. 1 in which the passage 100 is blocked. With full pressure acting on the directional clutch 16, the pressurized fluid in the ratio valve pressure chamber 94 of the ratio valve 92 is sufficient to maintain the ratio valve 92 in its blocking position against the opposition of the lower pressure in the load piston pressure chamber 80. Since the effective cross-sectional area of the slug 95 in the ratio valve 92 is three times smaller than the effective cross-sectional area of the end of the ratio valve 92 exposed to the load piston pressure chamber 80, any pressure level within the ratio valve pressure chamber 94 higher than three times the pressure level in the load piston pressure chamber 80 acts to hold the ratio valve 92 in the position to block fluid flow across the passage 100. Consequently, since the pressure level in the bypass control pressure chamber 84 is four times higher than the pressure level in the load piston pressure chamber 80 and the pressure level of the fluid in the ratio valve pressure chamber 94 is the same as the pressure of the fluid in the bypass control pressure chamber 84, the ratio valve 92 is held in the blocking position.

While operating in this mode of operation, the load piston reset control mechanism 110 is not effective, since the valving element 140 of the signal control valve 116 is being maintained in its first position by the biasing force of the spring 172, at which the second inlet port 144 of the housing 118 is blocked from the second outlet port 146 thereof. With the pressure signal from the distribution conduit 32, which is representative of the pressure level of the fluid in the directional clutch 16, being applied to the end of the valving element 120 of the trigger valve 114 through the signal port 128, the valving element 120 is maintained in its second position against the biasing force of the spring 134. Consequently, in this position, the pressurized fluid from the source 20 to the first outlet port 126 and the actuator port 148 is blocked and the actuator port 148 is in open communication with the reservoir 22 through the first outlet port 126, the bypass port 127, the passageway 149, and the second outlet port 146 thereof. Additionally, the accumulator piston 170 is in its first position since the second pressure chamber 164 of the signal control valve 116 is in open communication with the second outlet port 146 and the reservoir 22.

Referring now to FIG. 2, another operational mode of the fluid system 10 is illustrated. In this operational mode, the directional clutch 16 remains engaged and the selector valve 24 is moved to its second operative position so that the speed clutch 12 is vented and fluid is directed to the other speed clutch 14. As the speed clutch 12 is being vented and speed clutch 14 is being filled with the fluid from the source 20, the pressure level in the fluid system 10 quickly reduces. Due to the reduction of fluid pressure upstream of the differential valve 46, the poppet element 48 therein closes. As a result, the fluid pressure in the distribution conduit 32 downstream of the differential valve 46 cannot proportionally reduce in pressure However, the pressure downstream of the differential valve 46 does reduce due to inherent leakage in the elements of the modulating relief valve 54 and the components in the directional clutch 16.

As the pressure in the distribution conduit 32 downstream of the differential valve 46 reduces, the level of the pressure in the ratio valve pressure chamber 94 reaches the predetermined three-to-one relationship. Once the three-to-one pressure relationship is reached, the ratio valve 92 moves towards the rightward direction, as viewed in FIG. 2, to vent the fluid from the load piston pressure chamber 80 across the passage 100 to the reservoir 22. Since the pressure in the ratio valve pressure chamber 94 is reducing at a slower rate, the ratio valve 92 cannot move to a full open position. Consequently, the ratio valve 92, as generally illustrated in FIG. 2, regulates the fluid from the load piston pressure chamber 80. Since the fluid is being vented from the load piston pressure chamber 80 at a slow rate, the load piston 78 may not reach the full reset position, shown in FIG. 2, due to the fill pressure to the speed clutch 14 being to high or there not being sufficient time for the load piston 78 to fully reset before the new speed clutch 14 is filled and the system pressure begins to increase. Since the load piston 78 has not reached the full reset position, shown in FIG. 2, pressure applied to the clutches 14,16 may be higher than desired resulting in undesirable shift dynamics which may cause undue damage to the components therein.

In order to insure that the load piston 78 reaches its full reset position even with high fill pressures, the load piston reset control mechanism 110 operates to provide an additional vent path for the fluid in the load piston pressure chamber 80 as described hereinafter. As the pressure level of the fluid in the distribution conduit 32 downstream of the differential valve 46 reduces and reaches a predetermined value, for example 1,035 kpa (150 psi), the valving element 120 of the trigger valve 114 moves to its first position in response to the force of the spring 134. In its first position, the fluid pressure from the source 20 is directed through the first inlet port 124 of the housing 118 and to the first outlet port 126 thereof for communication with the actuator port 148 of the signal control valve 116. The presence of pressurized fluid in the first pressure chamber 160 of the signal control valve 116 exerts a force on the valving element 140 to move it from its first position towards its second position. At the second position of the valving element 140, the load piston pressure chamber 80 is in open communication with the reservoir 22 by way of the signal port 70 of the modulating pressure relief valve, the conduit 152, the second inlet port 144 of the housing 118, the valving element 140 of the signal control valve 116 and the second outlet port 146 thereof and the conduit 154.

With the valving element 140 of the signal control valve 116 in the second position, the second pressure chamber 164 of the signal control valve 116 is blocked from communicating with the second outlet port 146. Consequently, fluid pressure in the first pressure chamber 160 of the signal control valve 116 is communicated to the second pressure chamber 164 of the signal control valve 116 through the restrictive orifice 165 for pressurization thereof. As the fluid pressure in the second pressure chamber 164 increases, the valving element 140 begins to move towards its intermediate range of travel out of contact with the accumulator piston 170. The restrictive orifice 165 is of a size sufficient to allow the valving element 140 to move at a controlled rate. This controlled rate of movement provides additional time for the load piston pressure chamber 80 to fully vent. Therefore, the load piston 78 reaches its full reset position as illustrated in FIG. 2.

As the valving element 140 of the signal control valve 116, as illustrated in FIG. 3, moves within its intermediate range, after approximately two-tenths of a second of movement, it blocks the communication between the second inlet port 144 of the housing 118 and the second outlet port 146 thereof. At this time, the pressure in the load piston pressure chamber 80 begins to increase. As the pressure in the load piston pressure chamber 80 increases, the valving element 72 of the modulating relief valve 54 in cooperation with the load piston 78 controls, in a conventional manner, the rate of pressure rise of the fluid acting on the respective speed and directional clutches 14,16.

Simultaneously, as the valving element 140 of the signal control valve 116 continues moving in its intermediate travel range, the end of the valving element 140 thereof reaches a position at which the second pressure chamber 164 of the signal control valve 116 is controllably vented to the reservoir 22 across the second outlet port 146 thereof. Due to the controlled venting of the fluid from the second pressure chamber 164 of the signal control valve 116 and the continued supply of pressurized fluid across the restrictive orifice 165 thereof from the first pressure chamber 160, a pressure balance is achieved and the valving element 140 remains in the position illustrated in FIG. 4. At the same time, the system pressure continues to increase at the controlled rate as established by the modulating pressure relief valve 54.

Once the system pressure in the distribution conduit 32 downstream of the differential valve 46 reaches 1,035 kPa, the valving element 120 of the trigger valve 114 moves to its second position against the bias of the spring 134. With the valving element 120 of the trigger valve 114 in its second position, the first pressure chamber 160 of the signal control valve 116 is blocked from the source 20 and simultaneously vented to the reservoir across the valving element 120 and through the bypass port 127. Due to the absence of fluid pressure in the first pressure chamber 160 of the signal control valve 116 and the existence of pressurized fluid in the second pressure chamber 164, the valving element 140 is urged toward its first position. However, as the valving element 140 moves towards its first position, the second pressure chamber 164 is quickly vented to the reservoir 22 through the second outlet port 146. Simultaneously with the venting of the second pressure chamber 164, the spring 172 moves the accumulator piston 170 from its second position to its first position contacting the valving element 140 and the force of the spring 172 continues to force the valving element 140 to its first position as illustrated in FIG. 1. During this time period, the pressure to the respective clutches 14,16 continues to increase until the respective maximum levels are reached.

If the fill pressure to the speed clutch 14 is higher than the differential pressure across the differential valve 46, the excess flow across the differential valve 46 is bypassed to the reservoir 22 through the distribution conduit 32, the branch passage 55, the inlet port 62, across the valving element element 72, and out the drain port 68. This is possible because the load piston pressure chamber 80 remains in open communication with the reservoir 22 by way of the signal control valve 116, as previously described.

Referring to the graph illustrated in FIG. 5, the solid line 174 and the dashed line 176 generally represent the relationship of the clutches 12,14,16 during venting and the subsequent refilling of the speed clutches 12,14 during a speed shift. The venting of the speed clutch 12 is illustrated by the vertical portion of the solid line 174. The lower horizontal portion of the solid line 174 represents the time needed to fill the speed clutch 14 and the pressure of the fluid upstream of the differential valve 46 during fill. The fill pressure of the subject arrangement is approximately 450 kPa (65 psi). After the speed clutch 14 is filled, the pressure level increases to approximately 550 kPa (80 psi) and does not further increase since the load piston pressure chamber 80 is still open to the reservoir 22. The slope on the solid line 174 represents the rate of pressure increase of the fluid in the speed clutch 14 once the vent to the load piston pressure chamber 80 is closed and the force from the pressurized fluid being introduced through the restrictive orifice 98 in the ratio valve 92 starts to move the load piston 78 against the bias of the spring 82. The horizontal portion of the solid line 174 on the upper right of the graph in FIG. 5 illustrates the pressure level in the speed clutch 14 once the maximum $P_1$ pressure level in the fluid system 10 has been reached.

The dashed line 176 represents the pressure of the fluid in the directional clutch 16 downstream of the differential valve 46. The difference in the $P_1$ pressure and the $P_2$ is maintained at approximately 200 kPa. (29 psi). The decrease of pressure in the directional clutch 16 is illustrated in the graph by the dashed line that is slightly angled with respect to vertical. The slight angle to the dashed line 176 is representative of the slower rate of pressure decrease in the directional clutch 16 due to not having a direct vent path of the fluid to the reservoir 22. The pressure level in the directional clutch 16 reduces to approximately 300 kPa (43.5 psi) during a speed change while the speed clutch 12 is being emptied and the speed clutch 14 is being filled. Once the speed clutch 14 is filled, the pressure level in the directional clutch 16 increases to approximately 350 kPa (51 psi) which is the pressure level of the $P_2$ pressure needed to maintain the 200 kPa pressure differential between the speed and directional clutches 14,16. Since the vent passage to the load piston pressure chamber 80 is still open, the pressure level therein cannot increase. This extra period of time allows the load piston 78 to reach its full reset position illustrated in FIG. 2. This additional amount of time is made possible because the second inlet port 144 of the housing 118 remains in fluid communication with the second outlet port 146 thereof for a predetermined period of time as governed by the rate of fluid flow across the restrictive orifice 165 in the valving element 140 of the signal control valve 116. As illustrated in the graph, the time from opening of the vent path from the load piston pressure chamber 80 to the reservoir 22 to the time the vent path is closed is approximately 0.2 seconds. Once the vent path through the signal control valve 116 is closed, the pressure level in the directional clutch 16 increases. The sloped dashed line 176 in the graph represents the controlled increase in pressure of the fluid in the directional clutch 16 until the maximum pressure level is reached. As illustrated, once the maximum directional clutch pressure is obtained, the dashed line 176 is again horizontal.

The fluid system 10 and the load piston reset control mechanism 110 as set forth above provides an arrangement that ensures the load piston 78 is fully reset during a speed change by maintaining the load piston pressure chamber 80 in open communication with the reservoir 22 for a predetermined period of time. This arrangement eliminates the possibility of the speed and directional clutches 14,16 being initially engaged at higher pressure levels which creates harsh shocks to the system and the respective components therein.

Other aspects, objects and advantages of this invention can be obtained from the study of the drawings, the disclosure, and the appended claims.

What is claimed is:

1. A load piston reset control mechanism adapted for use in a fluid system having a source of pressurized fluid, a reservoir, first and second force transmitting mechanism adapted to receive fluid from the source, first and second selector valves connected between the source and the respective force transmitting mechanisms and each being movable to selectively direct fluid from the source to fill and pressurize each of the respective force transmitting mechanisms and to vent each of the force transmitting mechanisms to the reservoir, and a modulating pressure relief valve having a valving element operative to control the fluid flow to the force transmitting mechanisms and a load piston movable between a substantially unloaded position and a loaded position in response to a fluid pressure signal controllably received from one of the force transmitting mechanisms, the modulating relief valve being adapted to control the rate of pressure rise of the fluid directed to the force transmitting mechanisms, comprising:

valve means for controllably connecting said fluid pressure signal received from the one force transmitting mechanism with said reservoir in response to the pressure of the fluid directed to the one force transmitting mechanism being below a predetermined value.

2. The load piston reset control mechanism as set forth in claim 1, wherein the valve means includes a trigger valve adapted for connection with the source and with the fluid directed to the one force transmitting mechanism and a signal control valve adapted for connection with the fluid pressure signal acting on the load piston and with the reservoir.

3. The load piston reset control mechanism as set forth in claim 2, wherein the signal control valve is operative to selectively connect said fluid pressure signal acting on said load piston with said reservoir in response to the pressure level of the fluid directed to the one force transmitting mechanism being below the predetermined value.

4. The load piston reset control mechanism as set forth in claim 3, wherein the trigger valve is operative to direct pressurized fluid from the source to condition the signal control valve to an operative position which connects said fluid pressure signal acting on the load piston with said reservoir in response to the pressure level of the fluid directed to the one force transmitting mechanism being below the predetermined value.

5. The load piston reset control mechanism as set forth in claim 4, wherein the trigger valve includes an inlet port connectable with the source, an outlet port, and a signal port connectable with the fluid directed to the force transmitting mechanism, said trigger valve being movable between a first position at which said inlet port is in open communication with said outlet port and a second position at which the communication between the inlet port and the outlet port is blocked, the trigger valve is movable towards its first position in response to a spring and movable towards its second position in response to the pressure of the fluid directed to the force transmitting mechanism being greater than said predetermined value.

6. The load piston reset control mechanism as set forth in claim 5, wherein the signal control valve includes an actuator port in communication with the outlet port of the trigger valve, an inlet port connectable with the fluid pressure signal acting on the load piston, and an outlet port connectable to the reservoir, said signal control valve is movable between a first position at which communication between the inlet port and the outlet port thereof is blocked and a second position at which the inlet port is in open communication with the outlet port thereof, the signal control valve is movable towards the first position by a spring and movable towards the second position in response to the actuator port thereof being selectively connectable to said source through said trigger valve.

7. The load piston reset control mechanism as set forth in claim 6, wherein said signal control valve includes a valving element having first and second end portions slideably disposed therein, and an accumulator piston disposed therein adjacent the second end portion, said first end portion defining a first pressure chamber having a predetermined effective cross-sectional area, and a second pressure chamber having a larger effective cross-sectional area is defined between the second end portion of the valving element thereof and the accumulator piston, the first pressure chamber is in open communication with the actuator port thereof and in communication with the second pressure chamber through a restrictive orifice.

8. The load piston reset control mechanism as set forth in claim 7, wherein the accumulator piston is movable with respect to the valving element between a first position at which the accumulator piston is in contact with the second end portion of the valving element and a second position at which the accumulator piston is spaced from the second end portion thereof, said accumulator piston is biased towards its first position by a spring.

9. The load piston reset control mechanism as set forth in claim 8, wherein the valving element of the signal control valve is movable within an intermediate range at which the inlet port thereof is blocked from the outlet port thereof, the second pressure chamber is blocked from the outlet port thereof, and the accumulator piston is in its second position.

10. The load piston reset control mechanism as set forth in claim 9, wherein the second pressure chamber is in open communication with the outlet port thereof when the valving element is in its first position.

11. A load piston reset control mechanism in combination with a fluid system, comprising:

a source of pressurized fluid, a reservoir, first and second force transmitting mechanisms operative to receive fluid from the source, a first selector valve connected between the source and the first and second force transmitting mechanisms and movable between first and second operative positions to selectively direct fluid from the source to the first and second force transmitting mechanisms and to vent the fluid therefrom, a third force transmitting mechanism operative to receive fluid from the source, a second selector valve connected between the source and the third force transmitting mechanism and movable to selectively direct fluid from the source to fill and pressurize the third force transmitting mechanism and to vent fluid therefrom, a differential valve connected between the source and the second selector valve and operative to establish a lower pressure downstream thereof, and a modulating pressure relief valve connected between the differential valve and the second selector valve and operative to control the rate of pressure rise of the fluid directed to the respective force transmitting mechanisms, the modulating pressure relief valve has a valve element operative to control the fluid flow in the fluid system and a load piston movable between a substantially unloaded position and a loaded position in response to a fluid pressure signal controllably received from the third force transmitting mechanism; and valve means for controllably connecting said fluid pressure signal with said reservoir in response to the pressure of the fluid directed to the third force transmitting mechanism being below a predetermined value.

12. The combination as set forth in claim 11, wherein the valve means includes a trigger valve adapted for connection with the source and with the fluid directed to the third force transmitting mechanism and a signal control valve adapted for connection with the fluid pressure signal acting on the load piston and with the reservoir.

13. The combination as set forth in claim 12, wherein the signal control valve is operative to selectively connect said fluid pressure signal acting on said load piston with said reservoir in response to the pressure level of the fluid directed to the third force transmitting mechanism being below the predetermined value.

14. The combination as set forth in claim 13, wherein the trigger valve is operative to direct pressurized fluid from the source to condition the signal control valve to an operative position which connects said fluid pressure signal acting on the load piston with said reservoir in response to the pressure level of the fluid directed to the third force transmitting mechanism being below the predetermined value.

15. The combination as set forth in claim 14, wherein the signal control valve has an inlet port in fluid communication with the fluid pressure signal acting on the load piston, an outlet port in fluid communication with the reservoir, and an actuator port in selective communication with the source.

16. The combination as set forth in claim 15, wherein the trigger valve has an inlet port connected to the source upstream of the differential valve, a signal port connected in fluid communication downstream of the differential valve with the fluid being directed to the third force transmitting mechanism, and an outlet port connected to the actuator port of the signal control valve.

17. The combination as set forth in claim 16, wherein the trigger valve has a valving element movable between a first position at which the inlet port thereof is in open communication with the outlet port thereof and a second position at which the fluid communication between the inlet port and the outlet port is blocked, said valving element of the trigger valve is movable towards its first position by a spring and movable towards its second position in response to the pressure of the fluid directed to the third force transmitting mechanism being greater than said preselected value.

18. The combination as set forth in claim 17, wherein the signal control valve has a valving element movable between a first position at which fluid communication between the inlet port thereof and the outlet port thereof is blocked and a second position at which the inlet port thereof is in open communication with the outlet port thereof, the valving element of the signal control valve is movable towards the first position by a spring and movable towards the second position in response to the actuator port thereof being connected to said source through the valving element of the trigger valve.

19. The combination as set forth in claim 18, wherein the valving element of the signal control valve has first and second end portions and an accumulator piston slideably disposed therein adjacent the second end portion thereof, said first end portion defines a first pressure chamber having a predetermined effective cross-sectional area, and a second pressure chamber having a larger cross-sectional area being defined between the second end portion of the valving element in the signal control valve and the accumulator piston, the first pressure chamber being in open communication with the actuator port thereof and in communication with the second pressure chamber through a restrictive orifice.

20. The combination as set forth in claim 19 wherein the accumulator piston is movable with respect to the valving element of the signal control valve between a first position at which the accumulator piston is in contact with the second end portion thereof and a second position at which the accumulator piston is spaced from the second end portion thereof, said accumulator piston is biased towards its first position by a spring.

21. The combination as set forth in claim 20, wherein the valving element thereof is movable within an intermediate range at which the inlet port thereof is blocked from the outlet port thereof, the second pressure chamber is blocked from the outlet port thereof, and the accumulator piston is in its second position.

22. The combination as set forth in claim 21, wherein the second pressure chamber is in open communication with the outlet port of the signal control valve when the valving element thereof is in its first position.

* * * * *